(12) United States Patent
Anbalagan et al.

(10) Patent No.: US 9,542,140 B2
(45) Date of Patent: Jan. 10, 2017

(54) SYSTEMS AND METHODS FOR EDITING DOCUMENTS

(71) Applicant: XEROX CORPORATION, Norwalk, CT (US)

(72) Inventors: Ashok Raj Anbalagan, Chennai (IN); Venkata Ragavan Kondalam Sankaran, Chennai (IN)

(73) Assignee: Xerox Corporation, Norwalk, CT (US)

(*) Notice: Subject to any disclaimer, the term of this patent is extended or adjusted under 35 U.S.C. 154(b) by 0 days.

(21) Appl. No.: 14/731,442

(22) Filed: Jun. 5, 2015

(65) Prior Publication Data

US 2016/0357487 A1 Dec. 8, 2016

(51) Int. Cl.
*G06F 3/12* (2006.01)
*G06F 17/24* (2006.01)
*G06F 17/21* (2006.01)
*G06F 17/22* (2006.01)
*H04N 1/04* (2006.01)
*H04N 1/21* (2006.01)

(52) U.S. Cl.
CPC .......... *G06F 3/1265* (2013.01); *G06F 3/121* (2013.01); *G06F 3/127* (2013.01); *G06F 3/1246* (2013.01); *G06F 17/218* (2013.01); *G06F 17/2247* (2013.01); *G06F 17/2288* (2013.01); *G06F 17/24* (2013.01); *H04N 1/04* (2013.01); *H04N 1/2166* (2013.01); *H04N 2201/0094* (2013.01)

(58) Field of Classification Search
USPC ........................................................ 358/1.15
See application file for complete search history.

(56) References Cited

U.S. PATENT DOCUMENTS

| | | | |
|---|---|---|---|
| 2013/0254641 A1* | 9/2013 | Kamata | H04N 1/00222 715/202 |
| 2014/0365900 A1* | 12/2014 | Chu | G06F 17/30879 715/738 |
| 2015/0116773 A1* | 4/2015 | Shibata | H04N 1/00204 358/1.15 |

* cited by examiner

*Primary Examiner* — Saeid Ebrahimi Dehkord
(74) *Attorney, Agent, or Firm* — Jones Robb, PLLC (57) ABSTRACT

Systems and methods for automatically editing a softcopy document using a hardcopy markup document are disclosed. The method includes scanning pages of the hardcopy markup document including editing marks; identifying file information of the hardcopy markup document; retrieving the softcopy document corresponding to the hardcopy markup document from a storage device based on the identified file information; recognizing marked regions present on at least one of the scanned pages, the marked regions includes at least one of the editing marks; creating an edit information document based on the recognized marked regions; converting the marked regions into an editable format; and creating an edited softcopy document by making one or more changes on each page of the retrieved softcopy document based on the edit information document.

18 Claims, 7 Drawing Sheets

SYSTEMS AND METHODS FOR EDITING DOCUMENTS

TECHNICAL FIELD

The presently disclosed embodiments relate to multi-function electronic devices, such as a printer, a scanner, and more particularly to systems and methods for facilitating users to edit documents using hardcopy markup documents.

BACKGROUND

For editing documents, such as an electronic document, an editor, such as a senior editor, can either edit the electronic copy directly on the computing device, or may print a hardcopy, and then make hand-written mark-up corrections to the hardcopy. Based on the hardcopy including mark-ups, the senior editor or some other person can change the electronic copy later. Further, in the legal industry, for example, lawyers receive numerous memos and/or briefs that they mark up, edit, revise, and have their assistants make copies of to be distributed to other lawyers or their clients. Some editors may prefer marking-up a hardcopy to marking-up an electronic copy as it can be more convenient or comfortable to their tradition of working with pen and paper.

Further, the format or layout of text, etc., may change on the electronic document as editing marks are added. The three dimensional nature of hardcopy may help some people organize and structure their work and allow free form marking. Further, the editing marks on hardcopy can capture a history of interactions on the document. More than one editor can interact and communicate through written annotations. Lastly, hardcopy does not require any presentation device, such as computers, laptops, PDAs, cellular phones, etc. For these and other reasons, marking-up a document from a hardcopy can be preferred over marking-up an electronic document.

While marking-up the hardcopy can be convenient for the editor, it is also often tedious and time consuming to associate the indicated changes within the electronic document. In many instances, there are significant costs associated with the expense and time required to manually incorporate hand written editing markings such as proofreader's marks into an electronic document. The person must repeatedly reference the hardcopy markup, and manually associate the marking within the unmarked electronic copy.

SUMMARY

The present disclosure provides systems and methods for incorporation of editing marks in softcopy documents or electronic documents, which overcomes the above-referenced limitations and others.

The present disclosure finds particular application in conjunction with incorporating hand-written editing marks into an electronic document (softcopy document), and will be described with particular reference thereto. However, it is to be appreciated that the present disclosure is also amenable to other like applications. For example, one might make notes on a hard copy of slides presented at a meeting and collect those hand written notes by extracting the underlying slide images. In another example, people might extract hand written information from a paper copy of an electronic form.

An embodiment of the present disclosure provides a method for automatically editing a softcopy document using a hardcopy markup document. The hardcopy markup document may be a printed document including one or more editing marks. The softcopy document is an electronic document stored within an MFD or other device. The method includes scanning one or more pages of the hardcopy markup document that includes one or more editing marks on the document. In some embodiments, a scanning device of the MFD scans the pages of the hardcopy markup document. The method also includes identifying file information of the hardcopy markup document. In some embodiments, an editing device identifies the file information of the hardcopy markup document. The method further includes retrieving the softcopy document corresponding to the hardcopy markup document from a storage device based on the identified file information. In some embodiments, the editing device retrieves the softcopy document. Further, the method includes recognizing one or more marked regions present on at least one of the scanned pages of the hardcopy markup document. The marked regions may include at least one of the editing marks. In some embodiments, the editing device recognizes the marked regions present on the scanned pages. The method also includes creating an edit information document based on the recognized one or more marked regions. In some embodiments, the editing device creates the edit information document. The method also includes converting the one or more marked regions present on the scanned hardcopy markup document into an editable format, such as a text format, an MS word format, and so forth. In some embodiments, the editing device converts the marked regions into the editable format using an Optical Character Recognition (OCR) technology. The method further includes creating an edited softcopy document by making one or more changes on each page of the retrieved softcopy document based on the created edit information document to create an edited softcopy document. In some embodiments, the editing device creates the edited softcopy document based on the created edit information document.

Another embodiment of the present disclosure provides a system for automatically editing a softcopy document using a hardcopy markup document. The system includes a multi-function device (MFD) having a scanning device for scanning one or more pages of a document including the hardcopy markup document. The hardcopy markup document may include one or more editing marks. The system further includes an editing device for identifying file information of the hardcopy markup document. The file information may include a filename of the hardcopy markup document and a page number of each of the one or more pages. The editing device is also configured to retrieve the softcopy document corresponding to the hardcopy markup document from a storage device based on the identified file information. The editing device is also configured to recognize one or more marked regions present on each of the scanned pages of the hardcopy markup document. The marked regions may include at least one of the editing marks. The editing device is also configured to create an edit information document based on the recognized one or more marked regions. The editing device is also configured to convert the marked regions present on the scanned hardcopy markup document into an editable format (e.g., a text format) using the OCR technology. The editing device is also configured to create an edited softcopy document by making one or more changes on each page of the retrieved softcopy document based on the created edit information document.

Yet another embodiment of the present disclosure provides a non-transitory computer-readable medium comprising computer-executable instructions for automatically editing a softcopy document using a hardcopy markup document. The non-transitory computer-readable medium includes instructions for scanning one or more pages of the hardcopy markup document, the hardcopy markup document includes one or more editing marks; identifying file information of the hardcopy markup document; retrieving the softcopy document corresponding to the hardcopy markup document from a storage device based on the identified file information; recognizing one or more marked regions present on at least one of the scanned pages of the hardcopy markup document, wherein the one or more marked regions includes at least one of the editing marks; creating an edit information document based on the recognized one or more marked regions; converting the one or more marked regions present on the scanned hardcopy markup document into an editable format using the OCR technology; and creating an edited softcopy document by making one or more changes on each page of the retrieved softcopy document based on the created edit information document.

Other and further aspects and features of the disclosure will be evident from reading the following detailed description of the embodiments, which are intended to illustrate, not limit, the present disclosure.

BRIEF DESCRIPTION OF THE DRAWINGS

The illustrated embodiments of the disclosed subject matter will be best understood by reference to the drawings, wherein like parts are designated by like numerals throughout. The following description is intended only by way of example, and simply illustrates certain selected embodiments of devices, systems, and processes that are consistent with the disclosed subject matter as claimed herein.

DETAILED DESCRIPTION

The following detailed description is made with reference to the figures. Exemplary embodiments are described to illustrate the disclosure, not to limit its scope, which is defined by the claims. Those of ordinary skill in the art will recognize a number of equivalent variations in the description that follows.

The functional units described in this specification have been labeled as devices. A device may be implemented in programmable hardware devices such as processors, digital signal processors, central processing units, field programmable gate arrays, programmable array logic, programmable logic devices, cloud processing systems, or the like. The devices may also be implemented in software for execution by various types of processors. An identified device may include executable code and may, for instance, comprise one or more physical or logical blocks of computer instructions, which may, for instance, be organized as an object, procedure, function, or other construct. Nevertheless, the executables of an identified device need not be physically located together, but may comprise disparate instructions stored in different locations which, when joined logically together, comprise the device and achieve the stated purpose of the device.

Indeed, an executable code of a device could be a single instruction, or many instructions, and may even be distributed over several different code segments, among different applications, and across several memory devices. Similarly, operational data may be identified and illustrated herein within the device, and may be embodied in any suitable form and organized within any suitable type of data structure. The operational data may be collected as a single data set, or may be distributed over different locations including over different storage devices, and may exist, at least partially, as electronic signals on a system or network.

Reference throughout this specification to "a select embodiment," "one embodiment," or "an embodiment" means that a particular feature, structure, or characteristic described in connection with the embodiment is included in at least one embodiment of the disclosed subject matter. Thus, appearances of the phrases "a select embodiment," "in one embodiment," or "in an embodiment" in various places throughout this specification are not necessarily referring to the same embodiment.

Furthermore, the described features, structures, or characteristics may be combined in any suitable manner in one or more embodiments. In the following description, numerous specific details are provided, to provide a thorough understanding of embodiments of the disclosed subject matter. One skilled in the relevant art will recognize, however, that the disclosed subject matter can be practiced without one or more of the specific details, or with other methods, components, materials, etc. In other instances, well-known structures, materials, or operations are not shown or described in detail to avoid obscuring aspects of the disclosed subject matter.

Non-Limiting Definitions

In various embodiments of the present disclosure, definitions of one or more terms that will be used in the document are provided below.

A "Multi-Function Device" (MFD) as used herein includes a single device that offers a number of traditionally separate devices and functionalities, such as printing, copying, scanning, faxing, etc. The functionalities mainly include scanning, where sheets or documents are output in response to electronic signals (the signal may or may not include the image data itself).

As used herein, a "Graphical User Interface" (GUI) can include an interface on the device enabling a user to interact with the device or MFD. The GUI may include one or more graphical format objects.

As used herein, a "softcopy document" refers to an unprinted digital document or an electronic copy of data, such as a file that can be viewed on a display of a computer etc. The softcopy document may be displayed on any suitable display of a computing device such as that of a computer. Further, the softcopy may be sent as an attachment of an e-mail.

Further, a "hardcopy document" refers to a permanent reproduction, or copy, in the form of a physical object, of data of a file etc. on any suitable media such as a paper, plastic sheet, a cloth, wood, and so forth. The hardcopy can be a printed document including data of a file or of a softcopy document etc. Examples of hard copy document may include, computer printouts, tele-printer pages, OCR forms, continuous printed tapes, radio photo prints, and so forth.

As used herein, a "hardcopy markup document" refers to the physical reproduction, or copy, in the form of a physical object, of data of a file, etc., on any media including one or more markings or editing marks done by a user such as an editor. The hardcopy markup document may include a graphic, a chart, a photo, a PowerPoint presentation, an electronic file from a tablet or pen that has electronic handwriting and markups on it that could be entered directly into the MFD.

As used herein an "editing device" refers to a device configured to edit a softcopy document based on a hardcopy markup document. Further, the editing device may include a software, hardware, firmware, or combination of these. The editing device is further intended to include or otherwise cover all software or computer programs capable of performing the various heretofore-disclosed determinations, calculations, etc., for the disclosed purposes.

As used herein a "scanning device" includes a device configured to scan one or more hardcopy documents and produce an electronic copy corresponding to the one or more hardcopy documents. The scanning device may include software, hardware, firmware, and combination of these.

An "input device" as used herein may include a device configured to allow a user to provide one or more inputs. The input device may include an interface, software, hardware, and combination of these. The input device may receive one or more inputs from the user. Further, the input device may be a touch sensitive device configured to receive input from the user. The input device may receive voice, text inputs from the user.

As used herein, a "storage device" refers to a device for storing data or files. The storage device may include hardware, software or combination of these.

Further, the term "hot folder" refers to a designated location on a network or on a device, such as the MFD or printing device, for electronic files that are to be imported into the MFD for printing or processing. In the description section, the hot folder refers to a printing hot folder.

Further, as used herein, a "server device" or a "server" is a computer or device on a network configured to manage network resources. There may be different types of servers such as, a file server, a storage device, and so forth. In some embodiments, the server device may include multiple computers and storage devices.

As used herein, an "edit information file" refers to an electronic file including information about marked regions, editing marks present in the hardcopy markup document, and actions to be taken corresponding to the editing marks, and so forth. The edit information file may be an XML file including all such information.

Further, as used herein the term "file information" refers to information about hardcopy markup document.

Further, the device or system for automatically editing a softcopy document based on a hardcopy markup document may be a software, hardware, firmware, or combination of these. The device or the system is further intended to include or otherwise cover all software or computer programs capable of performing the various heretofore-disclosed determinations, calculations, etc., for the disclosed purposes. For example, exemplary embodiments are intended to cover all software or computer programs capable of enabling processors to implement the disclosed processes. Exemplary embodiments are also intended to cover any and all currently known, related art or later developed non-transitory recording or storage mediums (such as a CD-ROM, DVD-ROM, hard drive, RAM, ROM, floppy disc, magnetic tape cassette, etc.) that record or store such software or computer programs. Exemplary embodiments are further intended to cover such software, computer programs, systems and/or processes provided through any other currently known, related art, or later developed medium (such as transitory mediums, carrier waves, etc.), usable for implementing the exemplary operations disclosed below.

In accordance with the exemplary embodiments, the disclosed computer programs can be executed in many exemplary ways, such as an application that is resident in the memory of a device or as a hosted application that is being executed on a server and communicating with the device application or browser via a number of standard protocols, such as TCP/IP, HTTP, XML, SOAP, REST, JSON and other sufficient protocols. The disclosed computer programs can be written in exemplary programming languages that execute from memory on the device or from a hosted server, such as BASIC, COBOL, C, C++, Java, Pascal, or scripting languages such as JavaScript, Python, Ruby, PHP, Perl or other sufficient programming languages.

Some of the disclosed embodiments include or otherwise involve data transfer over a network, such as communicating various inputs or files over the network. The network may include, for example, one or more of the Internet, Wide Area Networks (WANs), Local Area Networks (LANs), analog or digital wired and wireless telephone networks (e.g., a PSTN, Integrated Services Digital Network (ISDN), a cellular network, and Digital Subscriber Line (xDSL)), radio, television, cable, satellite, and/or any other delivery or tunneling mechanism for carrying data. The network may include multiple networks or sub networks, each of which may include, for example, a wired or wireless data pathway. The network may include a circuit-switched voice network, a packet-switched data network, or any other network able to carry electronic communications. For example, the network may include networks based on the Internet protocol (IP) or asynchronous transfer mode (ATM), and may support voice using, for example, VoIP, Voice-over-ATM, or other comparable protocols used for voice data communications. In one implementation, the network includes a cellular telephone network configured to enable exchange of text or SMS messages.

Examples of a network include, but are not limited to, a personal area network (PAN), a storage area network (SAN), a home area network (HAN), a campus area network (CAN), a local area network (LAN), a wide area network (WAN), a metropolitan area network (MAN), a virtual private network (VPN), an enterprise private network (EPN), Internet, a global area network (GAN), and so forth.

Overview:

The present disclosure provides methods and systems for automatically editing softcopy document with markups from a hardcopy document including one or more pages containing marked-up text, images, formatting, etc. In a non-limiting example, a first user, such as an assistant of a senior editor, may take print out of pages or document that need to be reviewed by a second user for example, the senior editor. The second user may mark the pages with distinct editing mark(s) to indicate the corrections to be done. The editing mark(s) may be color coded using specific colors. The first user may collect the hardcopy markup document from the first user with the required changes to make to the softcopy version of the document. The first user may scan the pages of the hardcopy markup document on the MFD. In some embodiments, the pages of the hardcopy markup document include a file code, for example a quick response (QR) code, including file information. The file information may include a file name of the hardcopy markup document, etc. The MFD may identify the file code or may receive the file information from the user. Based on the file information retrieved from the file code or received from the user, a softcopy document is retrieved from a storage device. The storage device may be a USB device, a server device, a database of the MFD, a hot folder, and so forth. The MFD may recognize one or more marked regions including editing marks, proofreading marks, etc. on the hardcopy markup document by using Optical Character Recognition (OCR). The MFD may create an edit information file, such as an XML file, based on the recognized marked regions. The MFD then changes the softcopy document based on the edit information file to create an edited softcopy document.

Exemplary Embodiments

Figure 1A:
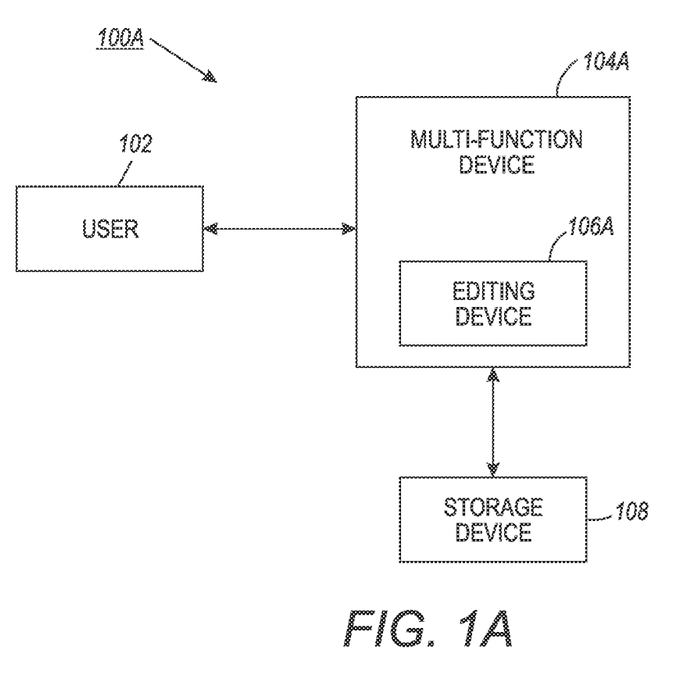
FIG. 1A is a schematic diagram illustrating an exemplary environment including a Multi-Function Device (MFD), in accordance with an embodiment of the present disclosure.

FIG. 1A is a schematic illustrating an exemplary environment 100A including a multi-function device 104A (MFD), in accordance with an embodiment of the present disclosure. The environment 100A primarily includes a user 102, a Multi-Function Device (MFD) 104A including an editing device 106A. The environment 100A also includes a storage device 108 coupled to the MFD 104A. The MFD 104A in turn may include one or more devices or modules, which may be hardware, software or combination of these, as described in detail with reference to FIG. 2. Further, the user 102 may interact with the MFD 104A for scanning one or more documents, for example, one or more pages of a magazine. In an exemplary scenario, the user 102 can put a hardcopy markup document on the MFD 104A for scanning one or more pages of the hardcopy markup document including one or more editing marks. The hardcopy markup document may include one or more editing marks made manually by a user such as the user 102. The editing device 106A can store the scanned copy of the hardcopy markup document and/or may e-mail the scanned copy to an e-mail ID of the user 102. The MFD 104A may be configured to request file information regarding hardcopy markup document from the user 102. In some embodiments, the one or more pages of the hardcopy markup document include a file code (not shown) including the file information.

The editing device 106A may extract the file code from the scanned copy of the hardcopy markup document. The file information may include a file name of the hardcopy markup document and page number, etc. The storage device 108 may store the files, softcopy documents corresponding to the hardcopy markup documents, user identity (ID) information, and so forth. The storage device 108 can be a USB device, a server device, a database at the MFD 104A, and so forth. The editing device 106A may retrieve a softcopy document corresponding to the hardcopy markup language based on the file information from the storage device 108. The editing device 106A may recognize one or more marked regions from the scanned copy of the hardcopy markup document. The marked regions may include editing mark(s). Examples of the editing marks are discussed with reference to FIG. 4.

The editing device 106A may create an edit information document based on the recognized marked regions. The edit information may include information such as, but not limited to, the file name, page number, marked regions, and action to be performed based on the editing mark(s) in the marked regions, and so forth. The edit information file may be created using a suitable electronic format such as, but not limited to, XML format, CSV format, and so forth. The editing device 106A may further convert one or more marked regions on the scanned copy of the hardcopy markup document into a text format. Further, the editing device 106A may make changes to the retrieved softcopy document based on the edit information file. This way the editing device 106A creates an edited softcopy document corresponding to the hardcopy markup document.

Figure 1B:
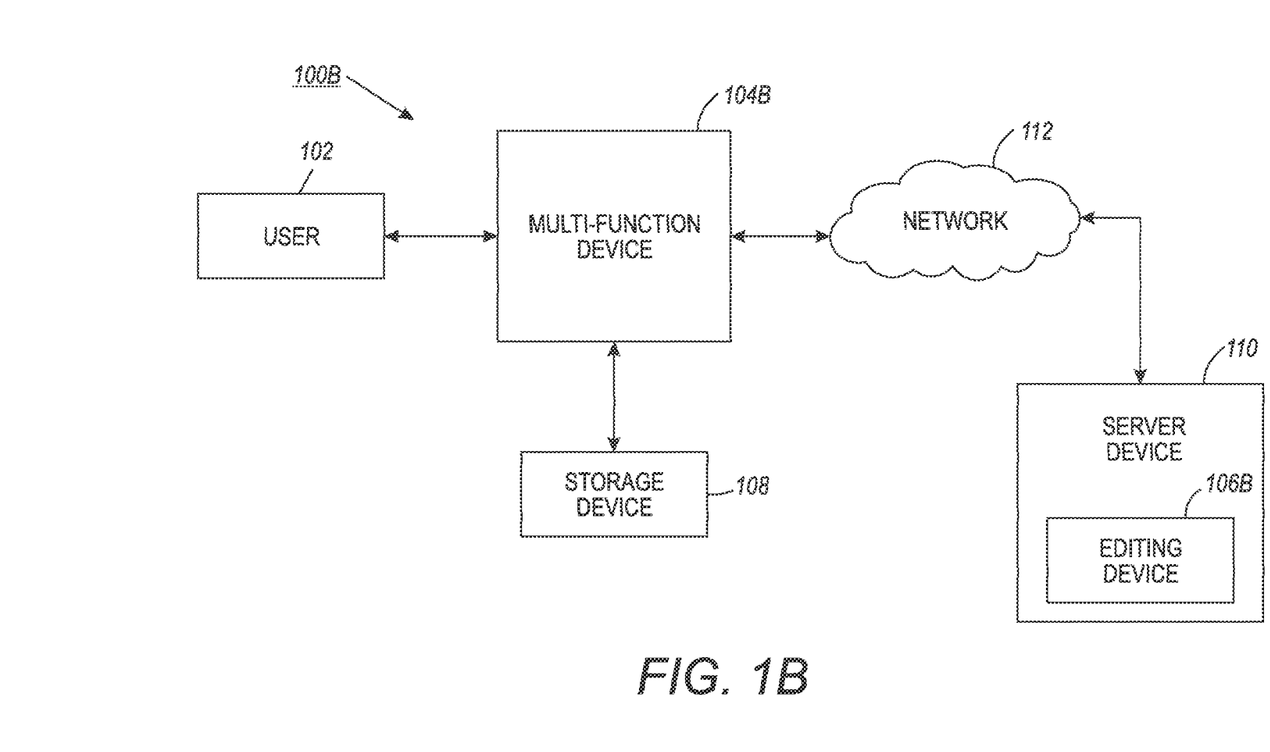
FIG. 1B is a schematic diagram illustrating an exemplary environment including another MFD, in accordance with an embodiment of the present disclosure.

FIG. 1B is a schematic illustrating an exemplary environment 100B including a multi-function device 104B (MFD), in accordance with an embodiment of the present disclosure. As shown, the environment 100B includes the user 102, the MFD 104B, and the storage device 108 coupled to the MFD 104B. The MFD 104B can interact with a server device 110 via a network 112. In some embodiments, the server device 110 includes an editing device 106B. The editing device 106B is similar in structure and function to the editing device 106A of FIG. 1A.

The network 112 can be a wireless network, a wired network or combination of these. The MFD 104B may send the edit information file and/or the softcopy document to the server device 110 for further processing and editing of the softcopy document based on the edit information file. The MFD 104B may include a transceiver (not shown) for transmitting the edit information file and/or the softcopy document to the server device 110. In some embodiments, the server device 110 includes the softcopy document corresponding to the hardcopy markup document. In this embodiment, the editing device 106B on the server device 110 may receive the scanned hardcopy document from the MFD 104B and the editing device 106B may process the scanned hardcopy document for creating the edited softcopy document. The editing device 106B may recognize marked regions on each of the pages of the scanned hardcopy markup document and may create the edit information document. Based on the edit information document, the editing device 106B may edit the softcopy document.

Hereinafter, whenever structures, features, functions, etc. are included and/or consistent with both the MFD 104A and the MFD 104B, the devices may be collectively referred to as an MFD 104. As discussed with reference to FIGS. 1A-1B, in some embodiments, the user 102 is registered with the MFD 104 using a login identity (ID) and/or password. The user 102 may be required to login to the MFD 104 by entering his/her login credentials on the MFD prior to the scanning the documents on the MFD 104. The MFD 104 may authenticate the user 102 based on the login credentials entered by the user 102. Post authentication, the user 102 may interact with the MFD 104 and can access one or more features of the MFD 104. For example, the user 102 may scan the hardcopy markup document.

In some embodiments, the user 102 registers with the MFD 104 at the time of configuration of the MFD 104, for example when the MFD 104 is first installed on the network 112. In alternative embodiments, the user 102 registers with the MFD 104 prior to interacting with the MFD 104. The MFD 104 can store and maintain the login credential of the user 102. In some embodiments, the storage device 108 may store and maintain the login credentials of the user 102.

Figure 2A:
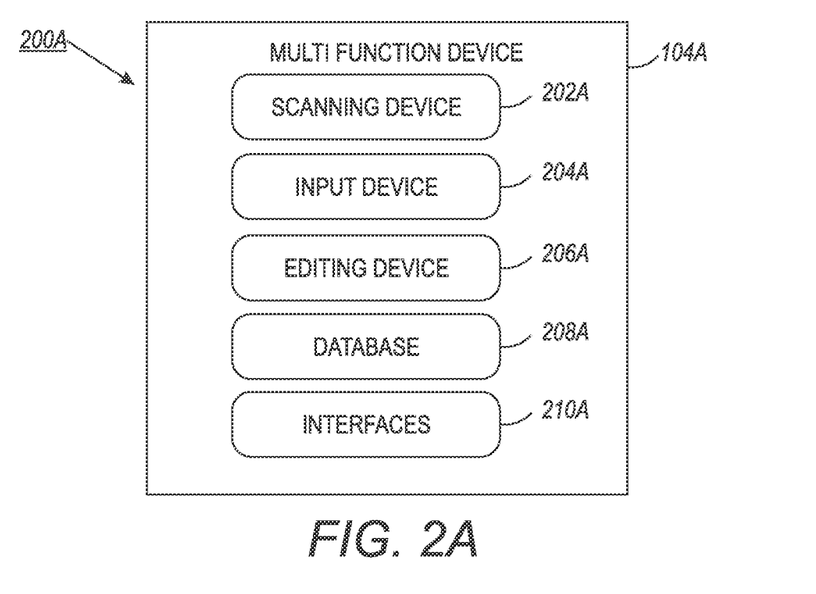
FIG. 2A is a block diagram illustrating various system elements of the exemplary MFD of FIG. 1A, in accordance with an embodiment of the present disclosure.

FIG. 2A is a block diagram 200A illustrating various system elements of the exemplary Multi-Function Device 104A of FIG. 1A, in accordance with an embodiment of the present disclosure. As discussed with reference to FIG. 1A, the user 102 can interact with the MFD 104A directly. For example, the user 102 can execute one or more job requests, such as a scanning request, on the MFD 104A.

As shown, the MFD 104A primarily includes a scanning device 202A, an input device 204A, an editing device 206A, and a database 208A. The MFD 104A, in one embodiment, is a computer hardware device with at least one processor (not shown) executing machine readable program instructions of the methods and functions of the embodiments. Such a system may include, in whole or in part, a software application working alone or in conjunction with one or more computer hardware resources. Such software applications may be executed by at least one processor at the MFD 104A computer hardware, or alternatively by multiple processors on different computer hardware platforms or emulated in a virtual environment.

The processor(s) may include, for example, microprocessors, microcomputers, microcontrollers, digital signal processors, central processing units, state machines, logic circuits, and/or any devices and computer memory that manipulate signals based on operational instructions. Among other capabilities, the processor(s) are configured to fetch and execute computer readable instructions.

Further, the MFD 104A may include one or more user interface(s) 210A (e.g., a Graphical User Interface). The interface(s) 210A may include a variety of software interfaces, for example, application programming interface, hardware interfaces, for example, cable connectors, USB connectors, and so forth. The interface(s) 210A may facilitate the user 102 to select a service on the MFD 104A. Examples of the service may include scanning, printing, photocopying, fax, and so forth. Further, one or more devices 202A-210A may function in association with the processor(s) for executing one or more instructions.

The user 102 can provide identity information to the MFD 104A for registration. The input device 204A may be configured to receive the login credentials from the user 102 entered by typing at the interfaces 210A. In some embodiments, an authentication device (not shown) on the MFD 104A can authenticate the user 102 based on the login credentials entered by the user 102. Post authentication, the user 102 can access one or more services on the MFD 104A. In some embodiments, the user 102 manually enters the identity information or/and login credentials on the MFD 104A at the interfaces 210A. In alternative embodiments, the user 102 may be registered by performing registration process or entering details on the network 112 or on the network devices without the need to approach or enter data on the MFD 104. The identity information may be provided by the user 102 during at least one of the time of configuration of the MFD 104A or at a particular time interval. The identity information of each of the user 102 may include, a user name, user ID, and so forth.

The database 208A can store the identity information of the user 102. The database 208A may also store the information about various job requests and about network devices present in the network 112. In some embodiments, the MFD 104A includes a user registration device (not shown) for registering the user 102 with the MFD 104A based on the identity information and/or login credentials provided by the user 102.

The user 102 may scan the documents such as a hardcopy markup document by placing it on an interface 210A of the MFD 104A. The scanning device 202A is configured to scan one or more pages of the hardcopy markup document. The editing device 206A is configured to identify file information of the hardcopy markup document. The file information may include a file name of the hardcopy markup document, page number of each of the one or more pages, author of the document, editor of the document, and so forth. In some embodiments, the editing device 206 may identify a file code present on one or more pages of the scanned hardcopy markup document. The file code can be, but not limited to, a Quick Response (QR) code, a bar code, and so forth. The file code may include the file information. In alternate embodiments, the editing device 206A may request the file information from the user 102 via one of the interfaces 210A. The user 102 may manually enter the file information and the input device 204A may receive the file information from the user 102.

The editing device 206 may also be configured to retrieve a softcopy document corresponding to the hardcopy markup document from a storage device such as the storage device 108 based on the file code and/or the file information. The storage device 108 can be the database 208A of the MFD 104A, a hot folder of the MFD 104A, a Universal Serial Bus (USB) device connected to one of the interfaces 210A, a server device 110, and so forth.

The editing device 206A may further be configured to recognize one or more marked regions present on each of the scanned pages of the hardcopy markup document. The marked region(s) may include one or more editing marks. The editing device 206A may recognize the marked regions by using suitable methods and systems. Examples of the marked regions recognition methods and systems may include, but are not limited to, handwriting recognition systems, image recognition systems, smart learning software systems programmed with pre-configured or dynamically configured rules based on common editing markings, and so forth. The editing marks may indicate a correction that should be done in the softcopy document corresponding to the scanned hardcopy markup document. The editing marks can be standard proofreader marks used by editors for editing documents. The editing marks may be done using a different colored pen/pencil etc. For example, if the text of the hardcopy document is of black color, then the editing marks may be done using a different color such as, but not limited to red, blue, green, and so forth. In some embodiments, the editing device 206 may recognize the marked regions based on the color used for editing the document.

In some embodiments, when the editing device 206A cannot identify a specific mark or editing marking other than standard editing marks, then the editing device 206A may ask the user 102 to provide an input or action, such as discard the mark etc. or provide instruction or command. The user 102 may provide the input/action or provide the instruction or command for processing of the specific mark at the MFD 104A. The MFD 104A may store the instruction or command for future purpose for processing of such specific marks. In some embodiments, while prompting the user for action for unidentified specific marks simultaneously the editing device 206A keeps on identifying the next marks in the hardcopy markup document and may not wait for the input from the user 102. Further, in case no input is received from the user 102, then the editing device 206A may discard the specific mark.

The editing device 206A may further be configured to create an edit information document based on the recognized one or more marked regions. The edit information document may be an extensible markup language (XML) file, a comma-separated values (CSV) file, and so forth. The editing device 206A may further be configured to convert the marked regions present on the scanned hardcopy markup document into text format or a word format. The scanned copy is an image file such as a JPEG, TIFF, etc. The editing device 206A may convert the marked regions into an editable format that can be edited electronically. In some embodiments, the editing device 206A may convert the marked regions into an editable format using the OCR technology.

The editing device 206A may further be configured to create an edited softcopy document by making one or more changes on each page of the retrieved softcopy document based on the created edit information document to create an edited softcopy document. The edited softcopy document may be displayed to the user 102 on the interfaces 210A of the MFD 104A, or may be sent to the e-mail ID of the user 102. In some embodiments, the edited softcopy document may be stored in the storage device 108 or the database 208A.

Though not shown, the editing device 206A may be present on any device in the network 112 such as, the server device 110. In such embodiments, the MFD 104A may not include the editing device 206A and the server device 110 may include the editing device 206A.

Figure 2B:
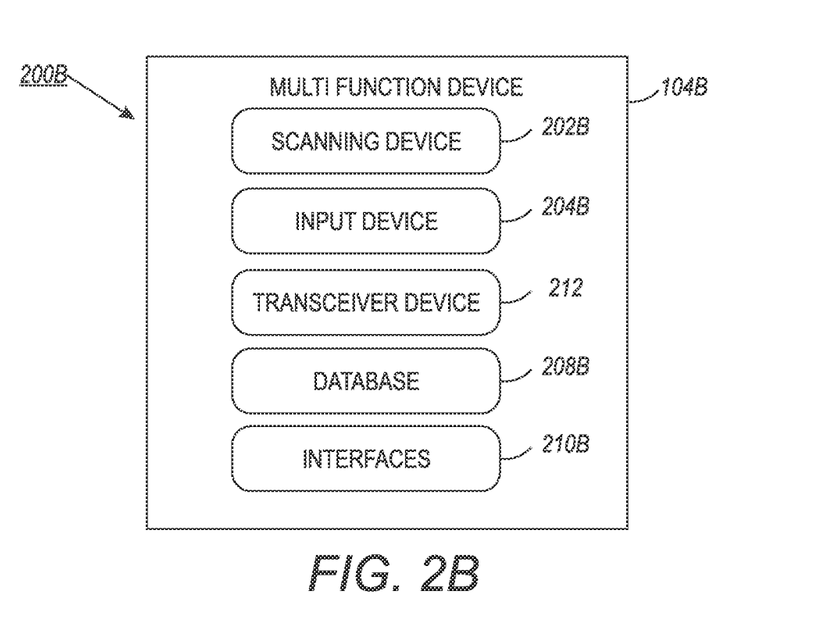
FIG. 2B is a block diagram illustrating various system elements of the exemplary MFD of FIG. 1B, in accordance with an embodiment of the present disclosure.

FIG. 2B is a block diagram illustrating various system elements of the exemplary MFD 104B of FIG. 1B, in accordance with another embodiment of the present disclosure. As shown, the MFD 104B primarily includes a scanning device 202B, an input device 204B, a transceiver device 212, a database 208B, and one or more user interfaces 210B. The scanning device 202B, the input device 204B, the database 208B, and the interfaces 210B are similar in function and structure to the scanning device 202A, the input device 204A, the database 208A, and the interfaces 210A, respectively.

The transceiver device 212 may be configured to receive electronic documents from the MFD 104B. The documents may be scanned hardcopy documents, softcopy documents, and other similar documents. The transceiver may also be configured to send the edited softcopy documents to the MFD 104B.

Figure 3:
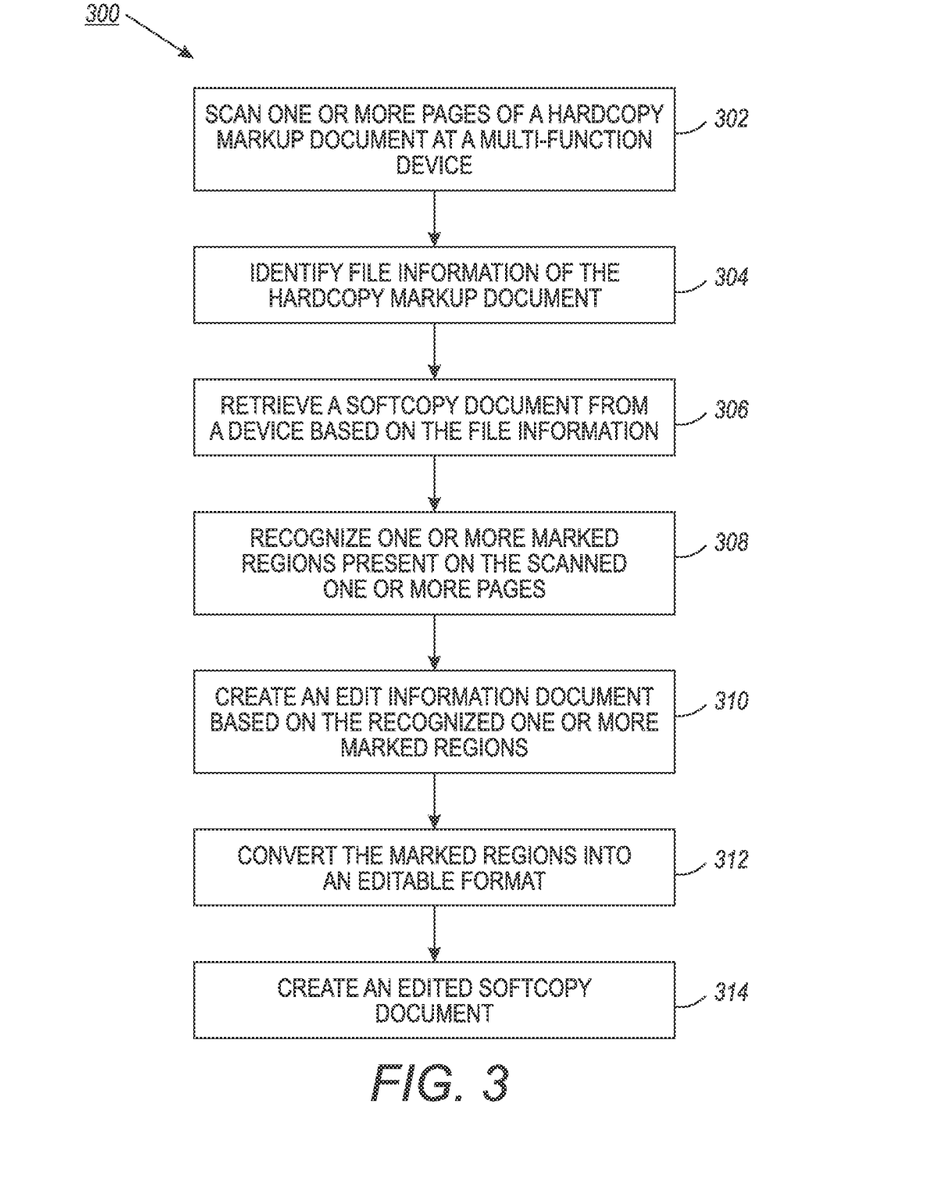
FIG. 3 is a flowchart illustrating an exemplary method for facilitating a user to edit a softcopy document using a hardcopy markup document including one or more pages implemented by the MFD of FIG. 1A, in accordance with an embodiment of the present disclosure.

FIG. 3 is a flowchart illustrating an exemplary method for facilitating a user to edit a softcopy document using a hardcopy markup document including one or more pages. As discussed with reference to FIG. 1A, the user 102 can register with the MFD 104A for accessing one or more services of the MFD 104A. The MFD 104A may further facilitate the user 102 to create an edited softcopy document based on the hardcopy markup document including one or more pages having editing mark(s). In some embodiments, another user may edit a hardcopy document and the user 102 may edit a softcopy document based on the edited hardcopy markup document.

At step 302, the user 102 may scan the one or more pages of the hardcopy markup document at the MFD 104A by using one of the interfaces 210A. In some embodiments, the scanning device 202 scans the pages of the hardcopy markup document. Further, the hardcopy markup document may include a graphic, a chart, a photo, a PowerPoint, an electronic file from a tablet or pen that has an electronic handwriting and markups on it that could be entered directly into the MFD 104A. In some embodiments, the user 102 may enter his/her login credentials for authentication at the MFD 104A. An authentication device of the MFD 104A may authenticate the user 102 and based on the authentication, the user 102 may be allowed to access the one or more services at the MFD 104A. The hardcopy markup document may include one or more editing marks made by either the user 102 or by some other user. The editing marks may be the standard editing marks that are usually used for editing documents. Examples of the editing marks may include, double underline for making the text being double underlined "BOLD", Striking a word for deleting the word, and so forth.

Then at step 304, file information of the scanned hardcopy markup document is identified. In some embodiments, the editing device 206A identifies the file information from the scanned hardcopy markup document. The file information can include such as, but not limited to, a file name, page numbers of the pages of the document, a date of created of the document, the author of the documents, and so forth. In some embodiments, the file information may be received by the input device 204A from the user 102 via the interfaces 210A. In alternate embodiments, the file information is extracted from a file code present on the scanned hardcopy markup document. The file code can be, but not limited to, a Quick Response (QR) code, a bar code, and so forth. The file code may include the file information.

At step 306, a softcopy document is retrieved from a storage device based on the file information. The softcopy document is the electronic document corresponding to the hardcopy markup document stored in the storage device 108. In some embodiments, the editing device 206A may also be configured to retrieve a softcopy document corresponding to the hardcopy markup document from a storage device such as the storage device 108 based on the file code and/or the file information. In some embodiments, the softcopy document is retrieved based on the text recognition of the text of the hardcopy markup documents. The storage device 108 can be the database 208A of the MFD 104A, a hot folder of the MFD 104A, a Universal Serial Bus (USB) device connected to one of the interfaces 210A, a server device 110, and so forth.

Then at step 308, one or more marked regions present on any page of the scanned hardcopy markup document are recognized. In some embodiments, the editing device 206A (or 106A) recognizes the marked regions. The marked regions may include editing mark(s). The editing mark(s) may indicate a correction that should be done in the softcopy document corresponding to the scanned hardcopy markup document. The editing mark(s) are the standard markings used by editors for editing documents. The editing mark(s) may be done using a different colored pen/pencil, etc. For example, if the text of the hardcopy document is of black color, then the editing mark(s) may be made using a different color such as, but not limited to red, blue, green, and so forth. In some embodiments, the editing device 206 may recognize the marked regions based on the color used for editing the document, or any other techniques known in the art, related art, or developed later including those corresponding to handwriting recognition systems, image recognition systems, and smart learning systems.

Thereafter, at step 310, an edit information document is created based on the recognized marked regions. The edit information document may be created by the editing device using any suitable format such as, but not limiting to, XML file format, CSV file format, and so forth. Then at step 312, the marked regions are converted into an editable format such as a text format. In some embodiments, the editing device 206 may convert the marked regions present on the scanned hardcopy markup document into an editable format, such as a text format or an MS word format, by using the OCR technology. Usually, the scanned copy is an image file such as a JPEG, etc. The editing device 206 may convert the marked regions into an editable format that can be edited electronically.

Thereafter, at step 314, an edited softcopy document is created by making one or more changes on each page of the retrieved softcopy document based on the edit information document. In some embodiments, the editing device 206 may create the edited softcopy document. The editing device 206 may further store the edited softcopy document at the storage device 108 or may send the same at an e-mail ID of the user 102.

Figure 4:
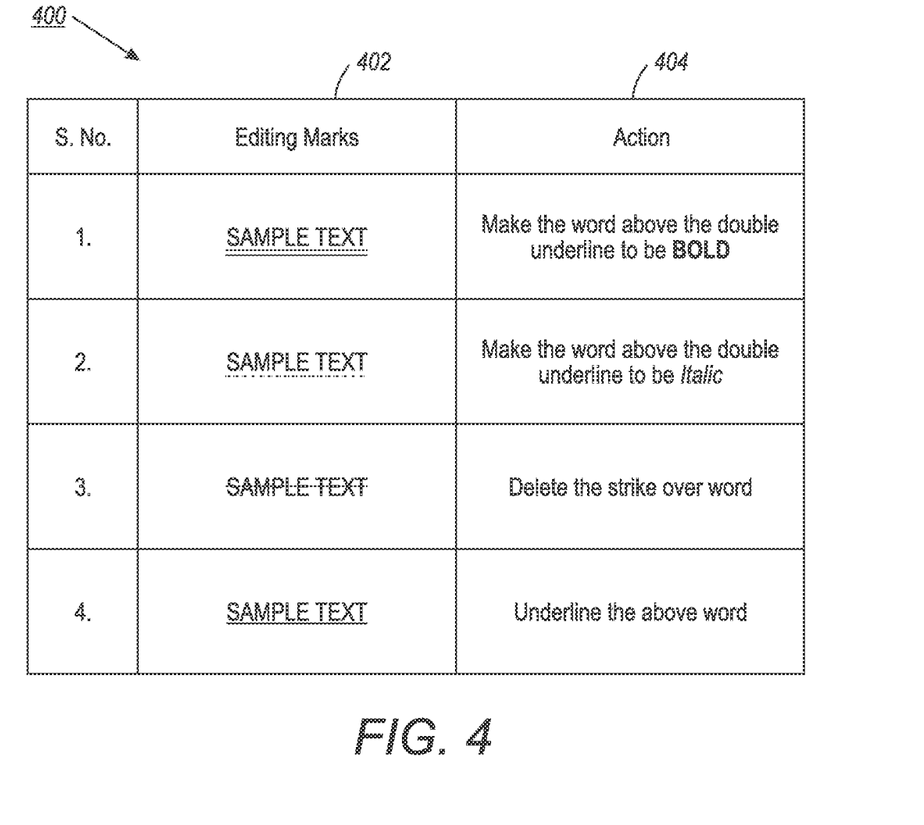
FIG. 4 shows a table including examples of editing marks and corresponding action to be performed by the MFD of FIG. 1A, in accordance with an embodiment of the present disclosure.

FIG. 4 shows a table 400 including examples of editing marks 402 and action 404 to be performed by the editing devices 106A, 106B (collectively, editing devices 106) of the MFD 104, in accordance with an embodiment of the present disclosure. The editing marks 402 can be made by double underlining the text, striking the text, underlining the text with a single line, underlining the text with dashed line, and so forth. As discussed with reference to FIG. 2A, 2B, the editing devices 206A, 206B (collectively, editing devices 206), or editing devices 106, recognize marked regions including the editing marks 402 on the scanned hardcopy markup document. The editing devices 106 may create an edit information file including the editing marks 402 and the action 404 to be taken on a softcopy document corresponding to the editing marks 402 on the scanned hardcopy markup document. Examples of the action 404 may include, but are not limited to, for a double underlined text may be converted into BOLD, single underlined text may be underlined, a dashed underlined text is converted to italic, a strike word may be deleted, and so forth.

In an exemplary scenario, the user 102 may print a document on a medium, such as a paper, a plastic sheet, wood, and so forth, for editing. The user 102 may edit the printed document, i.e., a hardcopy of the document using one or more editing marks. Further, the user 102 may make one or more editing marks 402 using a color different than that of text in the hardcopy markup document. For example, if the text in hardcopy document is of black color, then the editing marks 402 may be made using a red color. The user 102 or another user may create an edited softcopy document by using the MFD 104A as disclosed above. The user 102 can authenticate himself/herself at the MFD 104A by entering login credentials at the MFD 104A. The user 102 may then scan the hardcopy markup document at the MFD 104A to generate a scanned hardcopy markup document. The MFD 104A (or the editing device 106A of the MFD 104A) identifies the file information from a file code present on the scanned hardcopy markup document. The MFD 104A may request the file information from the user 102. The file information may include a file name of the scanned hardcopy markup document.

Based on the file information, the MFD 104A may retrieve a softcopy document corresponding to the scanned hardcopy markup document from the storage device 108, for example, a USB storage device. The one or more marked regions are recognized by the MFD 104A and an edit information file such as an XML file including information about editing marks and actions required for editing the softcopy document. The MFD 104A (or the editing device 106A) may make changes in the document based on the edit information document to create an edited softcopy document corresponding to the hardcopy markup document. Further, changes on each page of the softcopy document are made based on the edit information file.

In an embodiment, the MFD 104B may send the edit information file and/or the softcopy document to the server device 110 for further processing and creation of an edited softcopy document.

Figure 5A:
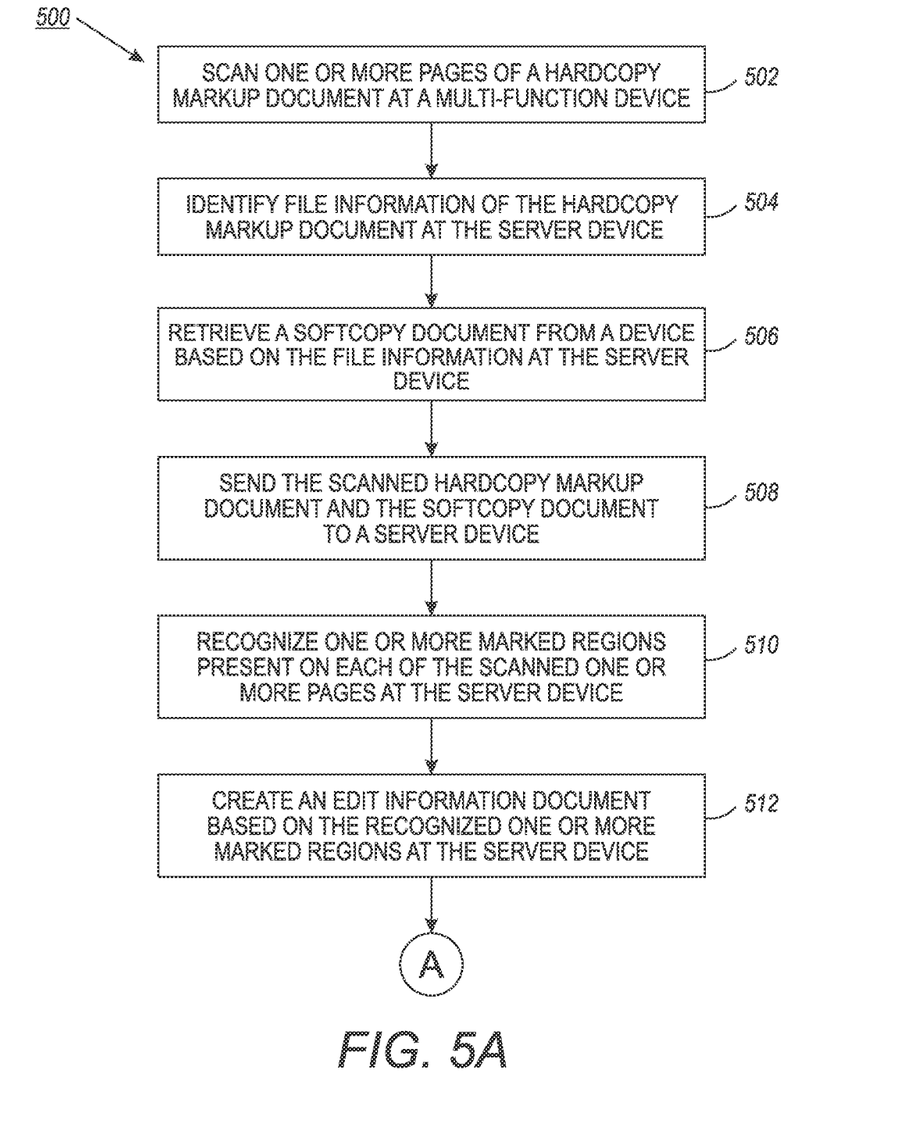
FIGS. 5A-5B is a flowchart illustrating an exemplary method for facilitating a user to edit a softcopy document using a hardcopy markup document including one or more pages implemented by the MFD and a server device of FIG. 1B.
Figure 5B:
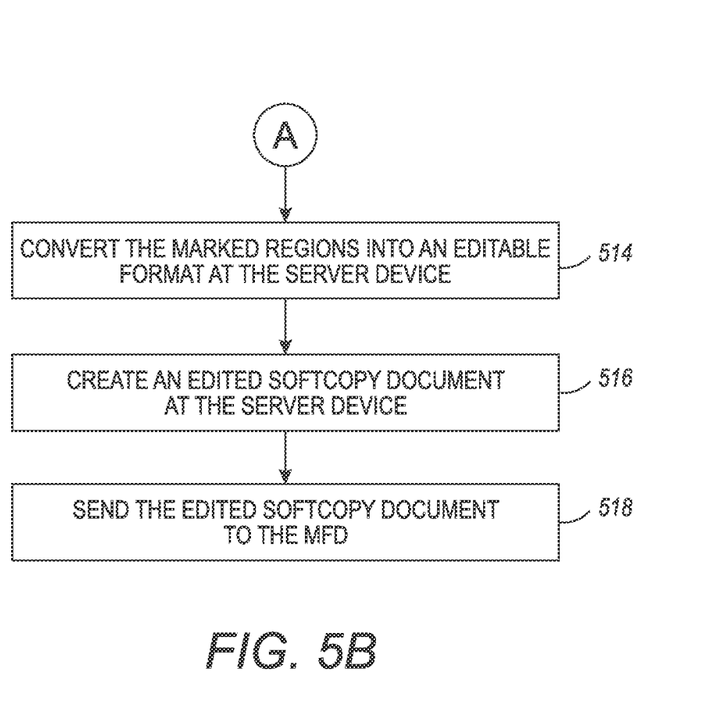

FIGS. 5A-5B is a flowchart illustrating an exemplary method 500 for facilitating a user to edit a softcopy document using a hardcopy markup document. As discussed with reference to FIG. 1B, the method 500 is implemented at the MFD 104B and the server device 110. As discussed with reference to FIG. 1B, the user 102 can register with the MFD 104B for accessing one or more services of the MFD 104B. The MFD 104B may send scanned files, such as a scanned hardcopy markup file, to the server device 110 via the network 112. The server device 110 may further process the scanned hardcopy markup file to create an edited softcopy document based on the hardcopy markup document including one or more pages having editing mark(s). In some embodiments, another user may edit a hardcopy document. For example, a senior editor may take a printout of the document to be edited and on the hardcopy he/she may make editing marks. Then he/she may ask his/her assistant to incorporate the changes in an electronic copy (i.e., a softcopy document) corresponding to the hardcopy of the document. The assistant may use the MFD 104B for creating an edited softcopy document corresponding to the hardcopy markup document.

At step 502, the user 102 may scan the one or more pages of the hardcopy markup document at the MFD 104B by using one of the interfaces 210A. In some embodiments, the scanning device 202B scans the pages of the hardcopy markup document and creates a scanned hardcopy document. In some embodiments, the user 102 may enter his/her login credentials for authentication at the MFD 104B. An authentication device of the MFD 104B may authenticate the user 102 and based on the authentication, the user 102 may be allowed to access the one or more services at the MFD 104B. The scanned hardcopy markup document may include one or more editing marks made by either the user 102 or by some other user. The editing marks may be the standard editing marks that are usually used for editing documents. Examples of the editing marks may include, double underline for making the text being double underlined "BOLD", striking a word for deleting the word, and so forth. Alternatively, some embodiments can configure the editing device 106B to read and process customized editing marks or specialized editing marks that can be associated with a particular language.

At step 504, file information of the scanned hardcopy markup document is identified. In some embodiments, the editing device 106B identifies the file information from the scanned hardcopy markup document. The file information can include document information such as, but not limited to, a file name, page numbers of the pages of the document, document creation date, the author of the documents, and so forth. In some embodiments, the file information may be received by the input device 204B from the user 102 via the interfaces 210B. In alternate embodiments, the file information is extracted from a file code present on the scanned hardcopy markup document. The file code can include, but is not limited to, a Quick Response (QR) code, a bar code, and so forth. The file code may include the file information.

At step 506, a softcopy document is retrieved from a storage device, such as the storage device 108, based on the file information. The softcopy document may be an electronic document corresponding to the hardcopy markup document stored in the storage device 108B. The softcopy document is similar to the hardcopy markup document but may not include any editing markings. In some embodiments, the editing device 106B may also be configured to retrieve a softcopy document corresponding to the hardcopy markup document from a storage device such as the storage device 108 based on the file code and/or the file information. The storage device 108 can be the database 208B of the MFD 104B, a hot folder of the MFD 104B, a Universal Serial Bus (USB) device connected to one of the interfaces 210B, a server device 110, and so forth.

Then at step 508, the MFD 104B may send the scanned hardcopy document to the server device 110 for further processing. In some embodiments, the MFD 104B may further send a softcopy document corresponding to the scanned hardcopy markup document to the server device 110. In alternative embodiments, the server device 110 may store the softcopy document corresponding to the scanned hardcopy markup document. Further, the transceiver device 212 may send the documents i.e. the softcopy document, scanned hardcopy markup document etc. to the server device 110.

Then at step 510, one or more marked regions present on each page of the scanned hardcopy markup document are recognized. In some embodiments, the editing device 106B of the server device 110 recognizes the marked regions. The marked regions may include editing mark(s). The editing mark(s) may indicate a correction that should be done in the softcopy document corresponding to the scanned hardcopy markup document. The editing mark(s) are the standard markings used by editors for editing documents. The editing mark(s) may be done using a different colored pen/pencil, etc. For example, if the text of the hardcopy document is of black color, then the editing mark(s) may be made using a different color such as, but not limited to red, blue, green, and so forth. In some embodiments, the editing device 106B may recognize the marked regions based on the color used for editing the document, or any other techniques known in the art, related art, or developed later including those corresponding to handwriting recognition systems, image recognition systems, and smart learning systems.

Thereafter, at step 512, an edit information document is created based on the recognized marked regions. The edit information document may be created by the editing device using any suitable format such as, but not limiting to, XML file format, CSV file format, and so forth. Then at step 514, the marked regions are converted into an editable format such as a text format. In some embodiments, the editing device 106B may convert the marked regions present on the scanned hardcopy markup document into an editable format, such as a text format or an MS word format, by using the OCR technology. Usually, the scanned copy is an image file such as a JPEG, etc. The editing device 106B may convert the marked regions into an editable format that can be edited electronically.

Thereafter, at step 516, an edited softcopy document is created by making one or more changes on each page of the retrieved softcopy document based on the edit information document. In some embodiments, the editing device 106B may create the edited softcopy document. The MFD 104B may include a GSM device (not shown) or suitable telecommunication network device for enabling exchange of messages, emails, etc., between the MFD 104B and network devices such as the server device 110 present in the network 112.

Then at step 518, the edited softcopy document is sent to the MFD 104B for presenting to the user 102. The edited softcopy document may be stored at the storage device 108 or may be sent to an e-mail ID of the user 102.

In some embodiments, the user 102 may also access the one or more functionality of the editing device 106B through an internet browsing application. Examples of the browsing applications may include Firefox Mozilla®, Google Chrome®, Internet Explorer®, and so forth. The user 102 may access by entering a uniform resource locator (URL) address on the MFD 104B or on a computing device like a computer, laptop, smart phone, and so forth. The MFD 104B may also send the scanned copy of the hardcopy markup document to the computing device of the user 102. The computing device may send the scanned hardcopy markup document and/or storage device to the server device 110 for creating an edited softcopy document.

It will be understood that the devices and the databases referred to in the previous sections are not necessarily utilized together method or system of the embodiments. Rather, these devices are merely exemplary of the various devices that may be implemented within a MFD (imaging device or scanning device), and can be implemented in exemplary another devices, and other devices as appropriate, that can communicate via a network to the exemplary imaging and printing devices.

It will be appreciated that several of the above-disclosed and other features and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

The terminology used herein is for the purpose of describing particular embodiments only and is not intended to be limiting of the disclosure. It will be appreciated that several of the above-disclosed and other features and functions, or alternatives thereof, may be combined into other systems, methods, or applications. Various presently unforeseen or unanticipated alternatives, modifications, variations, or improvements therein may subsequently be made by those skilled in the art without departing from the scope of the present disclosure as encompassed by the following claims.

What is claimed is:

1. A method for automatically editing a softcopy document corresponding to a hardcopy markup document, the method comprising:

scanning, by a scanning device, one or more pages of the hardcopy markup document, wherein the hardcopy markup document includes one or more editing marks, wherein each of the one or more editing marks indicates a correction to be performed to the softcopy document corresponding to the hardcopy markup document;

identifying, by an editing device, file information of the hardcopy markup document;

retrieving, by the editing device, the softcopy document corresponding to the hardcopy markup document from a storage device based on the identified file information;

recognizing, by the editing device, one or more marked regions present on at least one of the scanned pages of the hardcopy markup document, wherein the one or more marked regions includes at least one of the editing marks;

creating, by the editing device, an edit information document based on the recognized one or more marked regions;

converting, by the editing device, the one or more marked regions present on the scanned hardcopy markup document into an editable format; and creating, by the editing device, an edited softcopy document by performing the corrections to the retrieved softcopy document based on the created edit information document.

2. The method of claim 1 further comprising recognizing the marked regions based on the editing marks being color coded.

3. The method of claim 1, wherein identifying the file information of the hardcopy markup document further comprises identifying, by the editing device, a file code from the scanned one or more pages from the hardcopy markup document, wherein the file code comprises the file information.

4. The method of claim 3, wherein the file code is a Quick Response (QR) code.

5. The method of claim 1, wherein the storage device is at least one of a hot folder, a Universal Serial Bus (USB) device, and a server device.

6. The method of claim 1, wherein the edit information document is an extensible markup language (XML) file.

7. The method of claim 1, wherein the edit information document is a comma-separated values (CSV) file.

8. A system for automatically editing a softcopy document using a hardcopy markup document, the system including a multi-function device (MFD) comprising:

a scanning device for scanning one or more pages of a document including the hardcopy markup document, wherein the hardcopy markup document includes one or more editing marks, wherein each of the one or more editing marks indicates a correction to be performed to a softcopy document corresponding to the hardcopy markup document;

an editing device configured to:
 identify file information of the hardcopy markup document;
 retrieve the softcopy document corresponding to the hardcopy markup document from a storage device based on the identified file information;
 recognize one or more marked regions present at least one of the scanned pages of the hardcopy markup document, wherein the one or more marked regions includes at least one of the editing marks;
 creating an edit information document based on the recognized one or more marked regions;
 converting the one or more marked regions present on the scanned hardcopy markup document into an editable format; and
 creating an edited softcopy document by performing the corrections to the retrieved softcopy document based on the created edit information document.

9. The system of claim 8 further comprising an input device for receiving the file information from the user.

10. The system of claim 9, wherein the file code is a Quick Response (QR) code.

11. The system of claim 8, wherein the editing device is further configured to:
 identify a file code from the scanned one or more pages from the hardcopy markup document, wherein the file code comprises the file information; and
 retrieve the softcopy of the document from the storage device based on the file code.

12. The system of claim 8, wherein the storage device is at least one of a hot folder, a USB, and a server device.

13. The system of claim 8, wherein the edit information document is an extensible markup language (XML) file.

14. The system of claim 8, wherein the edit information document is a comma-separated values (CSV) file.

15. A non-transitory computer-readable medium comprising computer-executable instructions for automatically editing a softcopy document using a hardcopy markup document, the non-transitory computer-readable medium comprising instructions for:

scanning one or more pages of the hardcopy markup document, wherein the hardcopy markup document includes one or more editing marks, wherein each of the one or more editing marks indicates a correction to be performed to a softcopy document corresponding to the hardcopy markup document;

identifying file information of the hardcopy markup document;

retrieving the softcopy document corresponding to the hardcopy markup document from a storage device based on the identified file information;

recognizing one or more marked regions present on at least one of the scanned pages of the hardcopy markup document, wherein the one or more marked regions includes at least one of the editing marks;

creating an edit information document based on the recognized one or more marked regions;

converting the one or more marked regions present on the scanned hardcopy markup document into an editable format; and creating an edited softcopy document by performing the corrections to the retrieved softcopy document based on the created edit information document.

16. The non-transitory computer-readable medium of claim 15 further comprising instruction for receiving the file information from the user.

17. The non-transitory computer-readable medium of claim 15 further comprising instruction for:
 identifying a file code from the scanned one or more pages from the hardcopy markup document, wherein the file code comprises the file information; and
 retrieving the softcopy of the document from the storage device based on the file code.

18. The non-transitory computer-readable medium of claim 15, wherein the file code is a Quick Response (QR) code.

* * * * *